(12) United States Patent
Usami (10) Patent No.: US 11,390,417 B2
(45) Date of Patent: Jul. 19, 2022

(54) SYNTHETIC RESIN CONTAINER

(71) Applicant: YOSHINO KOGYOSHO CO., LTD., Tokyo (JP)

(72) Inventor: Tetsuro Usami, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 79 days.

(21) Appl. No.: 16/333,190

(22) PCT Filed: Jul. 4, 2017

(86) PCT No.: PCT/JP2017/024534
§ 371 (c)(1),
(2) Date: Mar. 13, 2019

(87) PCT Pub. No.: WO2018/061379
PCT Pub. Date: Apr. 5, 2018

(65) Prior Publication Data
US 2019/0225363 A1 Jul. 25, 2019

(30) Foreign Application Priority Data

Sep. 30, 2016 (JP) .............................. JP2016-194934

(51) Int. Cl.
*B65D 1/44* (2006.01)
*B65D 1/02* (2006.01)
*B65D 79/00* (2006.01)

(52) U.S. Cl.
CPC ................. *B65D 1/44* (2013.01); *B65D 1/02* (2013.01); *B65D 1/0223* (2013.01);
(Continued)

(58) Field of Classification Search
CPC .......... B65D 1/44; B65D 1/02; B65D 1/0246; B65D 1/42; B65D 1/46; B65D 2501/0027;
(Continued)

(56) References Cited

U.S. PATENT DOCUMENTS 5,303,834 A * 4/1994 Krishnakumar ..... B65D 1/0223
215/381
5,704,504 A * 1/1998 Bueno .................. B65D 1/0223
215/381
(Continued)

FOREIGN PATENT DOCUMENTS

JP H08-506310 A 7/1996
JP 2000-062743 A 2/2000
(Continued)

OTHER PUBLICATIONS

Apr. 2, 2019 International Preliminary Report on Patentability issued in International Patent Application No. PCT/JP2017/024534.
(Continued)

*Primary Examiner* — Rafael A Ortiz
*Assistant Examiner* — Sanjidul Islam
(74) *Attorney, Agent, or Firm* — Oliff PLC (57) ABSTRACT

A synthetic resin container, the container including: a parting line; and a plurality of reduced pressure absorbing panels each formed as a groove extending in the vertical direction while twisting in the circumferential direction, the reduced pressure absorbing panels being disposed in the trunk, in which: when the parting line passes through an upper part of a first reduced pressure absorbing panel and through a lower part of a second reduced pressure absorbing panel, the first reduced pressure absorbing panel is shallower in depth at the upper part thereof than at a central part thereof in the vertical direction, and the second reduced pressure absorbing panel
(Continued)

is shallower in depth at the lower part thereof than at a central part thereof in the vertical direction.

4 Claims, 5 Drawing Sheets

(52) U.S. Cl.
CPC ....... *B65D 1/0246* (2013.01); *B65D 79/0084* (2020.05); *B65D 2501/0018* (2013.01); *B65D 2501/0027* (2013.01); *B65D 2501/0036* (2013.01)

(58) Field of Classification Search
CPC ............ B65D 2251/023; B65D 23/102; B65D 2501/0036; B65D 1/0223; B65D 79/005
USPC .......................................................... 215/381
See application file for complete search history.

(56) References Cited

U.S. PATENT DOCUMENTS

| | | | | |
|---|---|---|---|---|
| 8,113,368 B2* | 2/2012 | Oguchi | ................... | B65D 1/42 215/381 |
| 2002/0150706 A1* | 10/2002 | Tachi | ................ | B65D 23/0864 428/34.5 |
| 2005/0269284 A1* | 12/2005 | Pedmo | ................ | B65D 1/0223 215/381 |
| 2006/0207961 A1* | 9/2006 | Kurtz | ................... | B65D 1/0223 215/382 |
| 2012/0175337 A1* | 7/2012 | Gill | ...................... | B65D 1/0276 215/381 |

FOREIGN PATENT DOCUMENTS

| | | |
|---|---|---|
| JP | 2007-314216 A | 12/2007 |
| JP | 2013-095428 A | 5/2013 |

OTHER PUBLICATIONS

Aug. 15, 2017 International Search Report issued in International Patent Application No. PCT/JP2017/024534.
Feb. 6, 2020 Office Action issued in Canadian Patent Application No. 3,036,096.
Apr. 29, 2020 Extended Search Report issued in European Patent Application No. 17855338.4.
Jun. 2, 2020 Office Action issued in Japanese Patent Application No. 2016-194934.

* cited by examiner

SYNTHETIC RESIN CONTAINER

TECHNICAL FIELD

The present disclosure relates to a bottle-shaped synthetic resin container including a mouth serving as a dispensing spout for a content medium, a trunk extending contiguous to the mouth via a shoulder, and a bottom closing a lower end of the trunk. In particular, the present disclosure relates to a synthetic resin container including the trunk provided with reduced pressure absorbing panels.

BACKGROUND

Due to their lightweightness and handleability, excellent stability for preservation of the content media, and inexpensive cost, synthetic resin containers, typical examples of which are oriented polypropylene (OPP) bottles and polyethylene terephthalate (PET) bottles, are used in various applications, such as beverages, foods, and cosmetics.

Such a synthetic resin container is known to include the trunk provided with reduced pressure absorbing panels to cope with so-called hot filling, in which the content medium, such as a beverage, including a juice beverage and tea, and a seasoning, including soy sauce, vinegar, and dressing, is filled at a high-temperature heated state. After the content medium is hot-filled, the mouth is closed with a cap. Then, as the content medium is cooled, the inside of the container is placed under reduced pressure, possibly causing the trunk to be deformed significantly. To address the above problem, the trunk may be provided with the reduced pressure absorbing panels, so that the reduced pressure inside the container may be absorbed through deformation of the reduced pressure absorbing panels, thereby preventing irregular deformation of the trunk or the like that would otherwise impair the appearance.

For example, Patent Literature 1 describes a synthetic resin container having a plurality of reduced pressure absorbing panels arranged side by side in the circumferential direction, the panels each having a concave shape depressed toward the inside of the container while extending as being inclined relative to the vertical direction. The described synthetic resin container prevents deterioration in rigidity otherwise caused by a reduction in thickness of the container while absorbing the reduced pressure inside the container through deformation of these reduced pressure absorbing panels, to thereby maintain the appearance and shape of the container in a favorable state even in a situation where the container is hot-filled with the content medium.

CITATION LIST

Patent Literature

PTL 1: JP2013-095428A

SUMMARY

Technical Problem

In order to more efficiently absorb reduced pressure to be generated inside the container, the reduced pressure absorbing panels may each be formed as a groove extending in the vertical direction while twisting in the circumferential direction about the central axis of the trunk.

Meanwhile, the aforementioned synthetic resin container is generally manufactured by blow molding such as extrusion blow molding (EBM) and biaxial stretching blow molding. In these blow molding processes, a right and left split mold is generally used. Examples of such right and left split mold may include a mold having right and left molds which relatively move so as to linearly depart from each other to thereby open the mold, and a mold having right and left molds that relatively move so as to depart from each other pivotally about a hinge to thereby open the mold.

However, when the aforementioned conventional synthetic resin container is blow molded, in which the reduced pressure absorbing panels are each formed as a groove extending in the vertical direction while twisting in the circumferential direction about the central axis of the trunk, the degree of undercut of the reduced pressure absorbing panels relative to the inner surface of the mold may become large depending on the positional relation between the split surface of the mold and the reduced pressure absorbing panels. In this case, there has been a problem in that the outer circumferential surface of the trunk may be scratched due to abrasion with the mold being opened after blow molding.

With this in view, the reduced pressure absorbing panels may be formed shallower in depth so as to make small the degree of undercut of the reduced pressure absorbing panels relative to the inner surface of the mold. In this case, however, the amount of reduced pressure to be absorbed by the reduced pressure absorbing panels will be reduced.

The present disclosure has been conceived of in light of the above problem, and thus has an object to provide a synthetic resin container capable of preventing the outer circumferential surface of the trunk from being scratched when opening the mold while ensuring the amount of reduced pressure to be absorbed by the reduced pressure absorbing panels.

Solution to Problem

The disclosed synthetic resin container in a bottle shape includes a mouth as a dispensing spout for a content medium, a trunk extending contiguous to the mouth via a shoulder, and a bottom closing a lower end of the trunk, the container including: a parting line formed on the trunk as extending in the vertical direction; and a plurality of reduced pressure absorbing panels each formed as a groove extending in the vertical direction while twisting in the circumferential direction about the central axis of the trunk, the reduced pressure absorbing panels being disposed in the trunk as being arranged side by side in the circumferential direction, in which, when the parting line passes through an upper part of a first reduced pressure absorbing panel and through a lower part of a second reduced pressure absorbing panel, the first reduced pressure absorbing panel is shallower in depth at the upper part thereof than at a central part thereof in the vertical direction, and the second reduced pressure absorbing panel is shallower in depth at the lower part thereof than at a central part thereof in the vertical direction.

In the disclosed synthetic resin container configured as described above, when the parting line passes through a central part in the vertical direction of a third reduced pressure absorbing panel, the depth at the central part in the vertical direction of the third reduced pressure absorbing panel may preferably be shallower than the depth at the central part in the vertical direction of the first reduced pressure absorbing panel and of the second reduced pressure absorbing panel.

In the disclosed synthetic resin container configured as described above, all the reduced pressure absorbing panels may each preferably have shallower depths at the upper part and the lower part thereof than the depth at the central part in the vertical direction of the first reduced pressure absorbing panel and of the second reduced pressure absorbing panel.

Advantageous Effect

According to the present disclosure, there can be provided a synthetic resin container capable of preventing the outer circumferential surface of the trunk from being scratched when the mold is being opened while ensuring the amount of reduced pressure to be absorbed by the reduced pressure absorbing panels.

DETAILED DESCRIPTION

The present disclosure will be described in more detail below by illustration with reference to the drawings.

Figure 1:
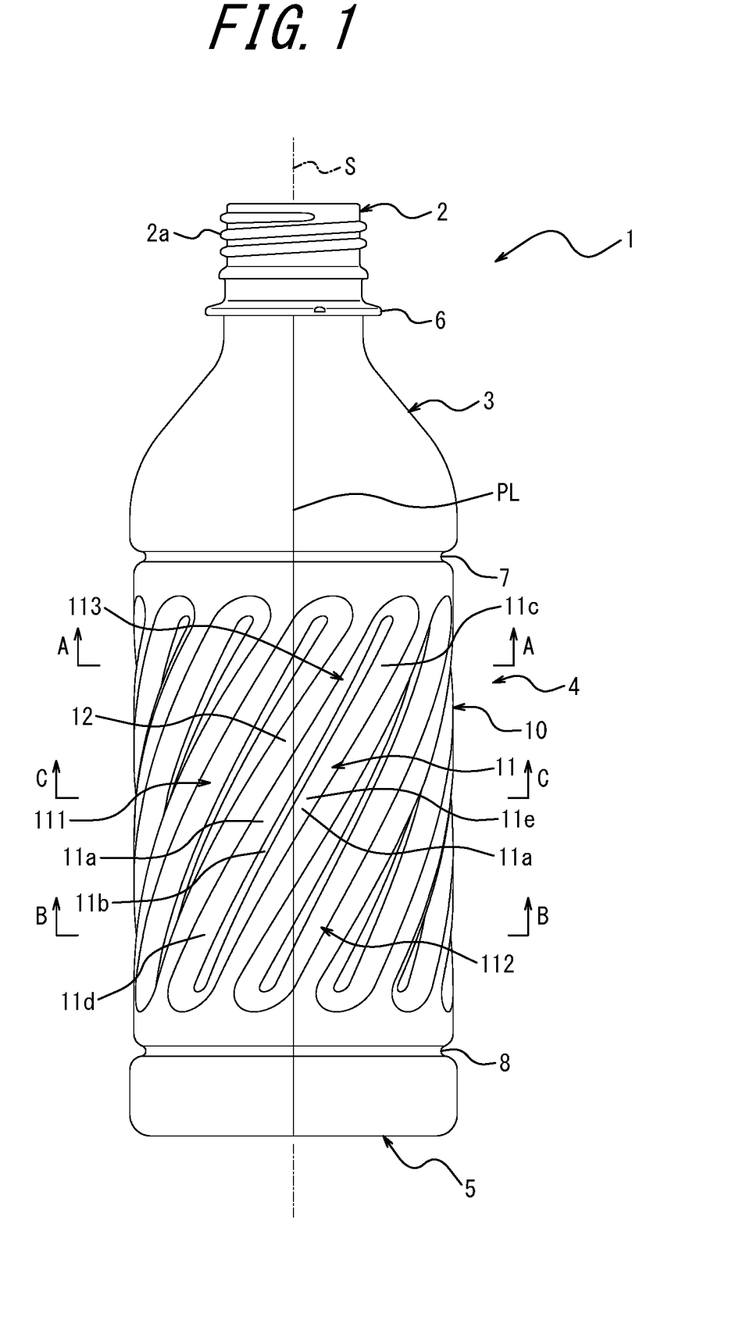
FIG. 1 is a front view illustrating the disclosed synthetic resin container according to one embodiment.

As illustrated in FIG. 1, the disclosed synthetic resin container 1 according to one embodiment contains, for example, a beverage, including a juice beverage and tea, or a liquid seasoning, including soy sauce, vinegar, and dressing, as the content medium. The synthetic resin container 1 is configured to cope with hot filling, in which the content medium is filled in a high temperature state where the content medium has been heated to a predetermined temperature. Here, the vertical direction of the synthetic resin container 1 corresponds to the upper and lower direction in FIG. 1.

The synthetic resin container 1 is formed in a bottle shape, which includes a mouth 2 as a dispensing spout for the content medium, a shoulder 3, which has a head-cut conical cylinder shape extending contiguous to a lower end of the mouth 2, a trunk 4, which has a substantially cylindrical shape extending contiguous to the mouth 2 via the shoulder 3, and a bottom 5, which closes a lower end of the trunk 4. Reference numeral S in FIG. 1 denotes the axis (central axis) common to the mouth 2, the shoulder 3, the trunk 4, and the bottom 5.

The synthetic resin container 1 is formed as a PET bottle, which is formed by biaxial stretch blow molding a polyethylene terephthalate preform.

The synthetic resin container 1 may also be formed by biaxial stretch blow molding a preform made of any type of thermoplastic synthetic resin, such as oriented polypropylene (OPP), other than polyethylene terephthalate. Furthermore, the method of producing the synthetic resin container 1 may adopt other blow molding methods, such as extrusion blow molding, in place of the biaxial stretch blow molding of a preform.

The mouth 2 has an outer circumferential surface provided with a male screw 2a. After the content medium is hot-filled, the mouth 2 may be closed with a cap, which is not illustrated, screw-connected to the male screw 2a. Alternatively, an annular protrusion may be provided, instead of the male screw 2a, on the outer circumferential surface of the mouth 2 and a cap may be fitted onto the annular protrusion so as to plug the mouth 2 by undercut fitting. Here, a neck ring 6 is provided between the mouth 2 and the shoulder 3.

The trunk 4 is provided with a reduced pressure absorbing portion 10. In the illustrated example, the reduced pressure absorbing portion 10 is provided over a predetermined range which is defined between an upper horizontal groove 7 and a lower horizontal groove 8 formed on the trunk 4, as being biased to the lower side of the trunk 4 in the vertical direction. The reduced pressure absorbing portion 10 is configured to deform so as to reduce the capacity of the synthetic resin container 1 in a case where the pressure inside the synthetic resin container 1 is reduced when the content medium at a high temperature is cooled after being hot-filled into the synthetic resin container 1 and the mouth 2 is closed with a cap, to thereby absorb the reduced pressure.

The upper horizontal groove 7 and the lower horizontal groove 8 are each depressed from the outer circumferential surface of the trunk 4 toward the inner side of the trunk 4 and formed in an annular shape extending in the circumferential direction over the entire circumference of the trunk 4. The upper horizontal groove 7 and the lower horizontal groove 8 configured as described above may be used to define the reduced pressure absorbing portion 10 in the trunk 4, so that the trunk 4 is increased in radial direction rigidity in a part adjacent to the reduced pressure absorbing portion 10. This configuration allows for preventing deformation of the trunk 4 in a part other than the reduced pressure absorbing portion 10 due to reduced pressure while allowing the reduced pressure absorbing portion 10 to preferentially deform so as to reduce the capacity of the synthetic resin container 1 when the pressure is reduced within the synthetic resin container 1.

The reduced pressure absorbing portion 10 is provided with a plurality of reduced pressure absorbing panels 11 arranged side by side in the circumferential direction. In FIG. 1, only one of the reduced pressure absorbing panels 11 is denoted by reference numeral for convenience; however, the reduced pressure absorbing portion 10 has a plurality of reduced pressure absorbing panels 11, which are arranged at regular intervals in the circumferential direction over an entire circumference of the reduced pressure absorbing portion 10. In this embodiment, the reduced pressure absorbing portion 10 is provided with twelve of the reduced pressure absorbing panels 11; however, the number of the reduced pressure absorbing panels 11 may be varied as desired.

The plurality of reduced pressure absorbing panels 11 each have a side surface 11a and a bottom surface 11b, and formed in a groove shape which is depressed toward the inside of the trunk 4. Further, the plurality of the reduced pressure absorbing panels 11 each extend in the vertical direction while twisting in the circumferential direction about the central axis (center line S) of the trunk 4, i.e., the reduced pressure absorbing portion 10. In other words, the plurality of the reduced pressure absorbing panels 11, each having a predetermined range on the upper side thereof as an upper part 11c, a predetermined range on the lower side thereof as a lower part 11d, and a predetermined range between the upper part 11c and the lower part 11d as a central part 11e, are each formed in a concave rib shape extending in a direction inclined relative to the vertical direction such that the upper part 11c and the lower part 11d are displaced from each other in the circumferential direction.

In this embodiment, the reduced pressure absorbing panel 11 has the upper part 11c ranging from a position 20 mm above the center position in the vertical direction thereof to the upper end, the lower part 11d ranging from a position 20 mm below the center position in the vertical direction thereof to the lower end, and a central part 11e ranging between 10 mm above and below the center position in the vertical direction.

Portions between the adjacent reduced pressure absorbing panels 11 are each formed as a support portion 12, which extends as being inclined relative to the vertical direction. In FIG. 1, only one of the support portions 12 is denoted by reference numeral for convenience; however, each portion between the adjacent reduced pressure absorbing panels 11 is formed as the support portion 12, and thus twelve of the support portions 12 are formed in total.

In this embodiment, the reduced pressure absorbing panels 11 each have a uniform circumferential width in the longitudinal direction; however, the central part 11e may have a narrower circumferential width than the circumferential widths of the upper part 11c and of the lower part 11d. Here, the circumferential width of the reduced pressure absorbing panel 11 is a circumferential distance between a point where one side surface 11a is intersecting with the support portion 12 and a point where the other side surface 11a is intersecting with the support portion 12.

Figure 2A:
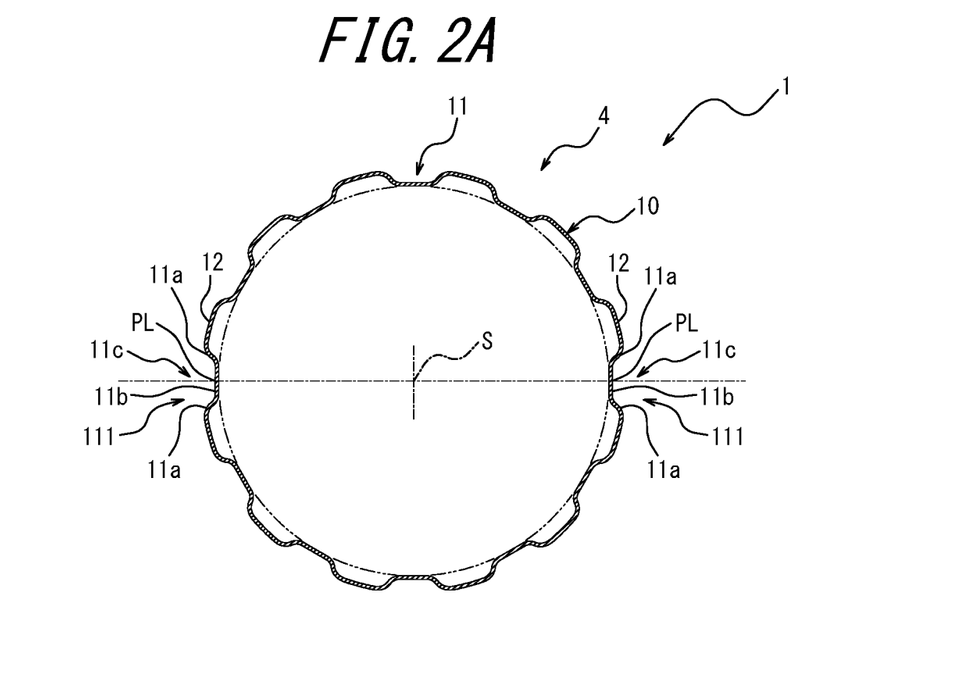
FIG. 2A is a sectional view taken along the line A-A of FIG. 1.
Figure 2B:
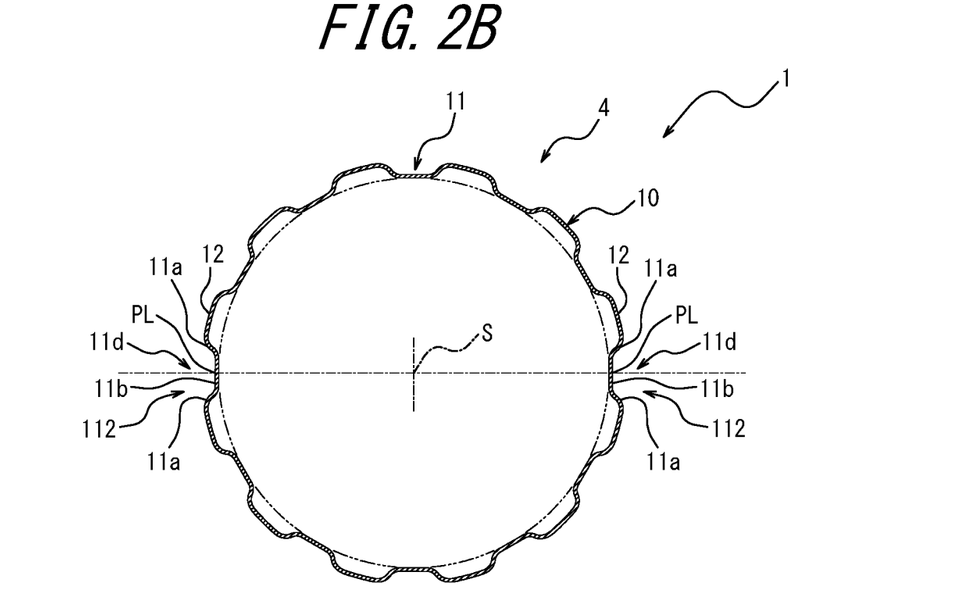
FIG. 2B is a sectional view taken along the line B-B of FIG. 1.

As described above, the synthetic resin container 1 is formed by biaxial stretch blow molding a polyethylene terephthalate preform. This biaxial stretch blow molding uses a right and left split mold, which opens right and left. Accordingly, the synthetic resin container 1 has a pair of parting lines PL each extending in the vertical direction along the shoulder 3, the trunk 4, and the bottom 5. These parting lines PL are formed as extending along the split faces of the mold during blow molding. Here, FIG. 1 shows only one of the parting lines PL; however, as can be understood from FIGS. 2A, 2B, and 3, the other parting line PL is formed at a position symmetrical to the one of the parting lines PL across the center line S.

The parting lines PL each pass through three of the reduced pressure absorbing panels 11 which are arranged side by side in the circumferential direction. More specifically, the parting line PL passes through the upper part 11c of the first reduced pressure absorbing panel 111, then passes through the central part 11e of the third reduced pressure absorbing panel 113 adjacent to the first reduced pressure absorbing panel 111, and further passes through the lower part 11d of the second reduced pressure absorbing panel 112 adjacent to the third reduced pressure absorbing panel 113. The parting line PL on the other side, which is not illustrated in FIG. 1, similarly passes through the upper part 11c, the central part 11e, and the lower part 11d of the respective one of the three reduced pressure absorbing panels 11 arranged side by side in the circumferential direction.

Here, the upper part 11c of the first reduced pressure absorbing panel 111, in which the parting line PL passes through the upper part 11c thereof, has a depth shallower than the central part 11e of the first reduced pressure absorbing panel 111 which is free of the parting line PL passing therethrough. Further, the lower part 11d of the second reduced pressure absorbing panel 112, in which the parting line PL passes through the lower part 11d thereof, has a depth shallower than the central part 11e of the second reduced pressure absorbing panel 112 which is free of the parting line PL passing therethrough. In this manner, the shallow upper part 11c and lower part 11d may be formed shallower as having a step-like part on the way to the central part 11e, or may be formed as a sloping part which gradually becomes shallower in depth from the upper and lower ends of the central part 11e toward the upper and lower ends of the reduced pressure absorbing panel 11.

Figure 3:
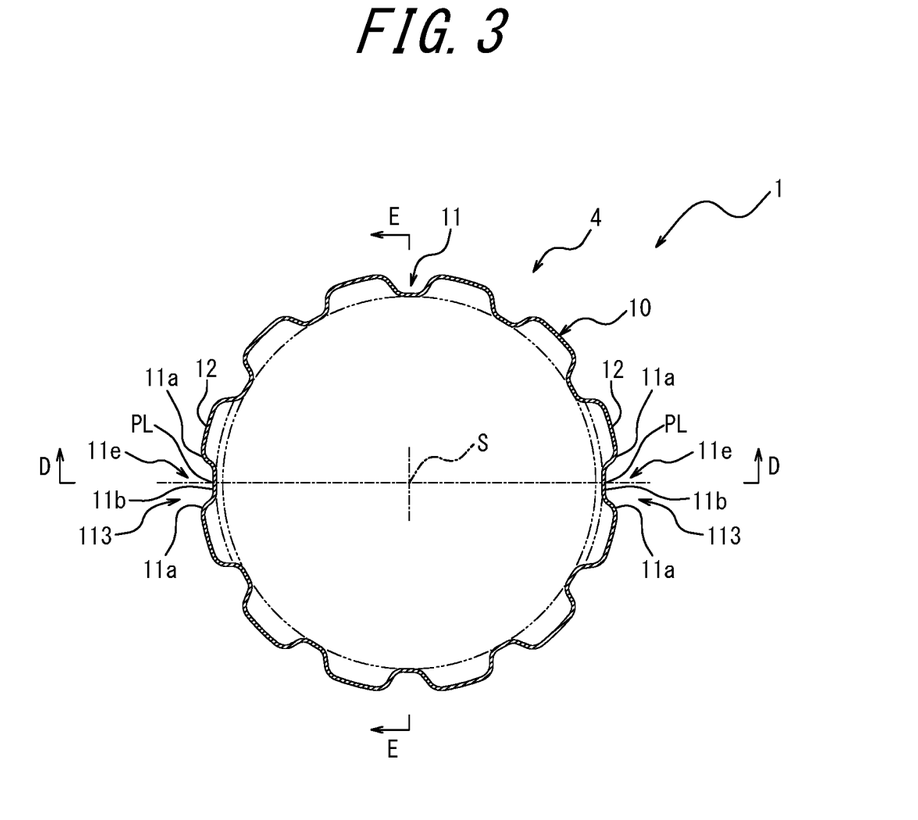
FIG. 3 is a sectional view taken along the line C-C of FIG. 1.
Figure 4:
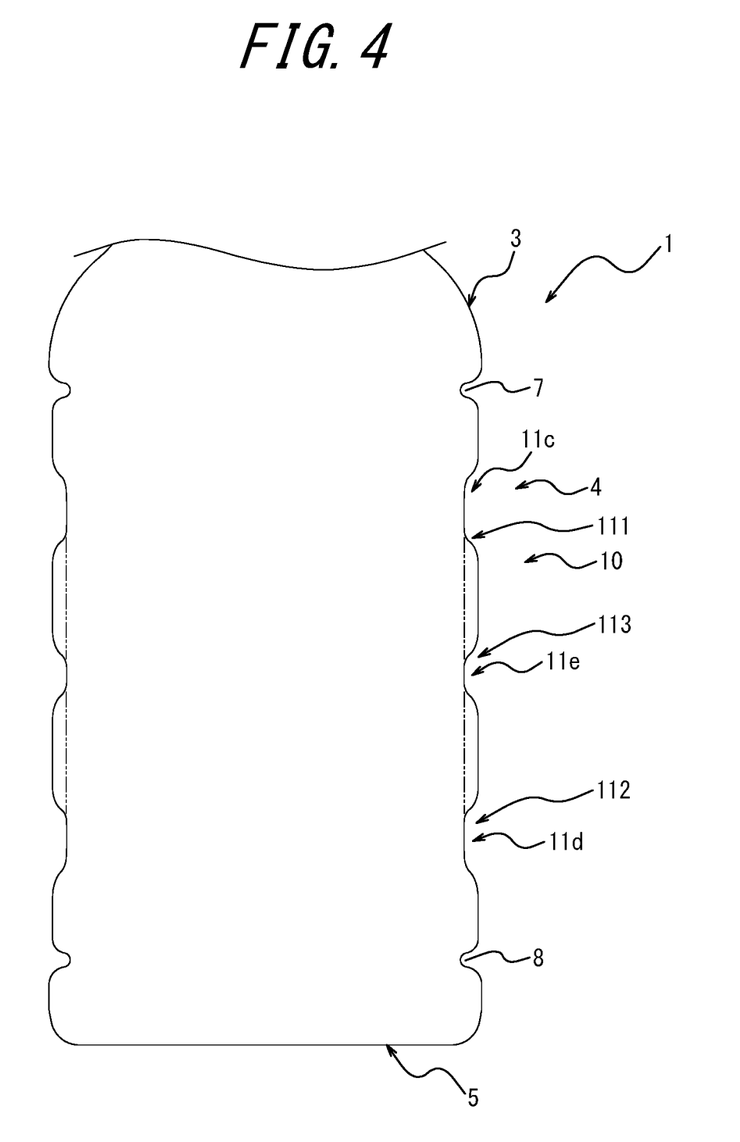
FIG. 4 is a schematic view of a section taken along the line D-D of FIG. 3.
Figure 5:
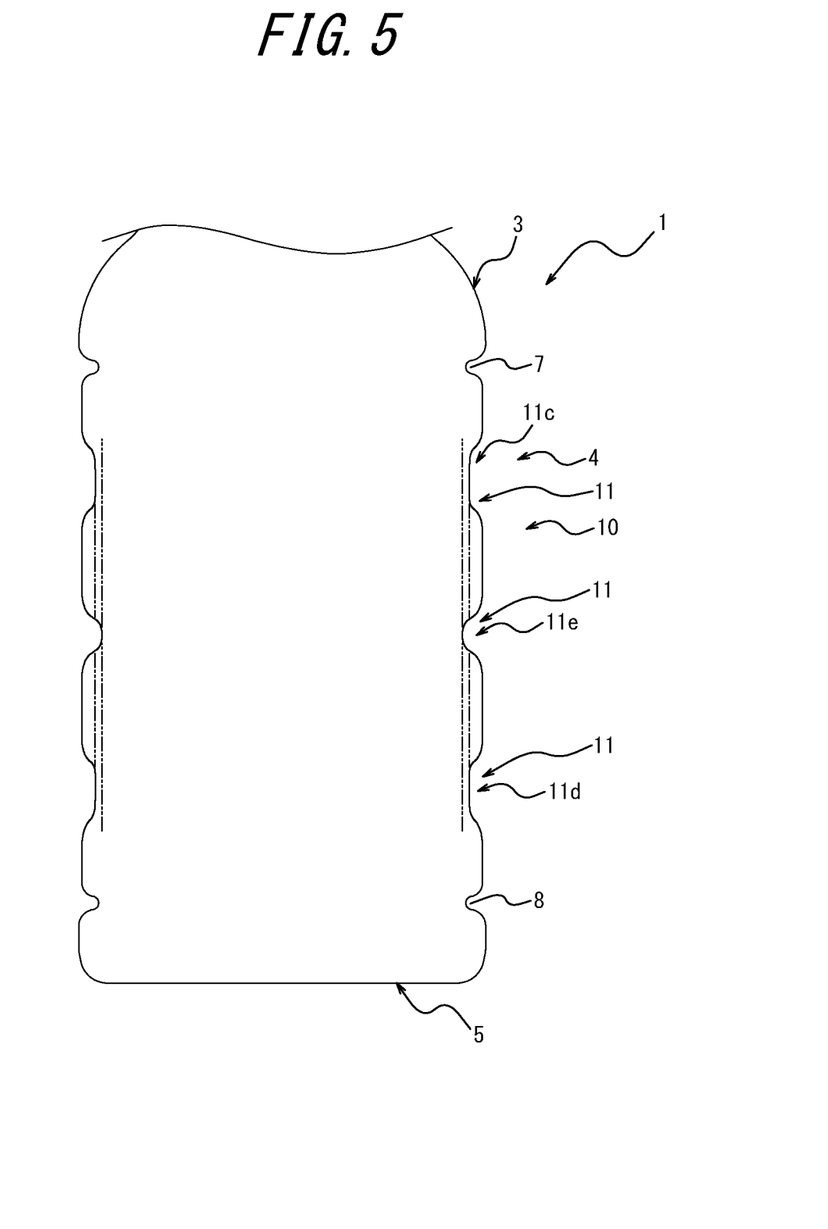
FIG. 5 is a schematic view of a section taken along the line E-E of FIG. 3.

Further, as illustrated in FIG. 3, the depth at the central part 11e of the third reduced pressure absorbing panel 113, in which the parting line PL passes through the central part 11e thereof, is shallower than the depth at the central part 11e of the first reduced pressure absorbing panel 111 or the depth at the center 11e of the second reduced pressure absorbing panel 112. In other words, as illustrated in FIG. 4, the depth at the upper part 11c of the first reduced pressure absorbing panel 111, the depth at the lower part 11d of the second reduced pressure absorbing panel 112, and the depth at the central part 11e of the third reduced pressure absorbing panel 113 are mutually the same.

Further, as can be appreciated from FIGS. 2A, 2B, 3, and 5, in each of the six rest of the reduced pressure absorbing panels 11 which are free of the parting line PL passing therethrough, the depths at the upper part 11c and at the lower part 11d are shallower than: the depth at the central part 11e of the reduced pressure absorbing panel 11; the depth at the central part 11e of the first reduced pressure absorbing panel 111; and the depth at the central part 11e of the second reduced pressure absorbing panel 112. In other words, all the reduced pressure absorbing panels 11 including: the first reduced pressure absorbing panel 111; the second reduced pressure absorbing panel 112; and the third reduced pressure absorbing panel 113, each have shallower depths at the upper part 11c and the lower part 11d thereof than: the depth at the central part 11e of the first reduced pressure absorbing panel 111; and the depth at the central part 11e of the second reduced pressure absorbing panel 112.

The third reduced pressure absorbing panel 113 has the same depth at the upper part 11c, the lower part 11d, and the central part 11e thereof. That is, the reduced pressure absorbing panel 113 has a constant depth in the longitudinal direction. When the third reduced pressure absorbing panel 113 is configured to have the same depth at the upper part 11c, the lower part 11d, and the central part 11e, a portion between the upper part 11c and the central part 11e and a portion between the lower part 11d and the central part 11e may each be configured deeper than the upper part 11c, the lower part 11d, and the central part 11e, respectively, without being limited to making the third reduced pressure absorbing panel 113 constant in depth in the longitudinal direction.

Here, the depth of the reduced pressure absorbing panel 11 refers to an amount of depression toward the radially inside (center line S side) of the trunk 4 between an open end (outer circumferential surface of the trunk 4) and the bottom surface 11b of the reduced pressure absorbing panel 11 formed in a groove shape.

In the synthetic resin container 1 according to this embodiment, the trunk 4 is provided with the reduced pressure absorbing portion 10 having a plurality of the reduced pressure absorbing panels 11. Thus, even when the pressure inside the synthetic resin container 1 is reduced due to hot filling, the plurality of the reduced pressure absorbing panels 11 and the support portions 12 deform in the twisting direction so as to increase the inclination angle, which allows for effective absorption of the reduced pressure, to thereby stably maintain the appearance and shape of the trunk 4 in a favorable state. In particular, even when the synthetic resin container 1 is reduced in wall thickness for such purposes as weight reduction, the reduced pressure can still be effectively absorbed so as to stably maintain the appearance and shape of the trunk 4 in a favorable state.

Meanwhile, the reduced pressure absorbing panel 11 formed as a groove extending in the vertical direction is high in rigidity at the upper part 11c and the lower part 11d as compared with the central part 11e, and this tendency is particularly noticeable when the upper horizontal groove 7 and the lower horizontal groove 8 are formed. Therefore, when a right and left split mold which opens right and left is used to blow mold the synthetic resin container 1 having the parting line PL passing through the upper part 11c and the lower part 11d of any of the reduced pressure absorbing panels 11, the upper part 11c and the lower part 11d, which each engage with the inner surface of the mold in an undercut manner, fail to readily deform when the mold is being opened, which tends to cause scratches on the outer circumferential surface of the trunk 4. In contrast, if the entire depth of the reduced pressure absorbing panel 11 is reduced, trying to make smaller the degree of undercut relative to the inner surface of the mold, the amount of reduced pressure to be absorbed by the reduced pressure absorbing panels 11 will be reduced.

In light thereof, in the synthetic resin container 1 of this embodiment, the central part 11e of the reduced pressure absorbing panels 11 which is free of the parting line PL passing therethrough is configured to have a depth that can ensure a desired amount of reduced pressure to be absorbed, while the upper part 11c of the first reduced pressure absorbing panel 111, in which the parting line PL passes through the upper part 11c thereof, is made shallower than the depth at the central part 11e of the first reduced pressure absorbing panel 111, and at the same time, the lower part 11d of the second reduced pressure absorbing panel 112, in which the parting line PL passes through the lower part 11d thereof, is formed shallower in depth than the central part 11e of the second reduced pressure absorbing panel 112. This configuration allows for ensuring the amount of reduced pressure to be absorbed by the respective reduced pressure absorbing panels 11, while making small the degree of undercut at the upper part 11c of the first reduced pressure absorbing panel 111 relative to the inner surface of the mold and the degree of undercut at the lower part 11d of the second reduced pressure absorbing panel 112 relative to the inner surface of the mold, to thereby prevent the outer circumferential surface of the trunk 4 from being scratched due to abrasion with the mold being opened. At this time, the central part 11e of the reduced pressure absorbing panel 11, the central part 11e of the first reduced pressure absorbing panel 111, and the central part 11e of the second reduced pressure absorbing panel 112, which are free of the parting line PL passing therethrough, all have the same depth.

Further, in the synthetic resin container 1 of this embodiment, as to the depth at the central part 11e of the reduced pressure absorbing panel 11, when the parting line PL passes through the central part 11e of the third reduced pressure absorbing panel 113, only the central part 11e of the third reduced pressure absorbing panel 113 alone is formed shallower in depth than the central part 11e of the first reduced pressure absorbing panel 111 or the central part 11e of the second reduced pressure absorbing panel 112. This configuration allows for ensuring the amount of reduced pressure to be absorbed by the reduced pressure absorbing panels 11, that is, the amount of reduced pressure to be absorbed by the entire reduced pressure absorbing portion 10, while making small the degree of undercut at the central part 11e of the third reduced pressure absorbing panel 113 relative to the inner surface of the mold, to thereby prevent the outer circumferential surface of the trunk 4 around the central part 11e of the third reduced pressure absorbing panel 113 from being scratched due to abrasion with the mold being opened.

Further, in the synthetic resin container 1 of this embodiment, all the reduced pressure absorbing panels 11 are each formed such that the depths of the upper part 11c and the lower part 11d thereof are shallower than the depth at the central part 11e of the first reduced pressure absorbing panel 111 or at the central part 11e of the second reduced pressure absorbing panel 112, to thereby form the reduced pressure absorbing portion 10 and the trunk 4 in a uniform shape in the circumferential direction. This configuration allows the reduced pressure absorbing portion 10 to be readily deformed in the twisting direction, to thereby increase the amount of reduced pressure to be absorbed by this reduced pressure absorbing portion 10. Here, all the reduced pressure absorbing panels 11 have the same depth at the upper part 11c thereof, and all the reduced pressure absorbing panels 11 have the same depth at the lower part 11d thereof. Further, all the reduced pressure absorbing panels 11 preferably have the same depth at the upper part 11c and the lower part 11d; however, the upper part 11c and the lower part 11d may have different depths.

EXAMPLES

In order to investigate the effect of the present disclosure, a synthetic resin container as Example and two synthetic resin containers of Comparative Examples were prepared, and each of the synthetic resin containers was evaluated for the amount of reduced pressure to be absorbed and the presence of scratches arising from mold opening.

The synthetic resin containers of Example, Comparative Example 1, and Comparative Example 2 each had a basic shape of FIG. 1, and were different from one another in configuration only in terms of depth of the reduced pressure absorbing panel. The reduced pressure absorbing panel had a central part ranging between 10 mm above and below the center position in the vertical direction, an upper part ranging from a position 20 mm above the center position in the vertical direction thereof to the upper end, and a lower part ranging from a position 20 mm below the center position in the vertical direction thereof to the lower end. When varying the depth thereof, the depth was gradually varied between the upper part and the central part, or between the lower part and the central part.

In Example, all the reduced pressure absorbing panels had a depth of 2.0 mm at the upper part and at the lower part thereof, and the reduced pressure absorbing panel having the parting line passing through the central part thereof had a depth of 2.0 mm at the central part thereof, and the rest of the reduced pressure absorbing panels each had a depth of 3.0 mm at the central part thereof.

In Comparative Example 1, all the reduced pressure absorbing panels each had a constant depth of 3.0 mm at the upper part, lower part, and central part thereof.

In Comparative Example 2, all the reduced pressure absorbing panels each had a constant depth of 2.0 mm at the upper part, lower part, and central part thereof.

As to the amount of reduced pressure to be absorbed, it was evaluated as "pass" when a predetermined reduced pressure absorbing capacity was ensured, and evaluated as "fail" when a predetermined reduced pressure absorbing capacity was not ensured. Further, as to the presence of scratches arising from mold opening, it was evaluated as "absent" when "no scratch was visually identified", and as "present" when "scratches were visually identified".

Table 1 shows the evaluation results.

TABLE 1

|  | Example | Comparative Example 1 | Comparative Example 2 |
|---|---|---|---|
| amount of reduced pressure to be absorbed | pass | pass | fail |
| scratches arising from mold opening | absent | present | absent |
| panel depth (mm) | 3.0 (2.0 in part) | 3.0 | 2.0 |

As can be appreciated from Table 1, in the synthetic resin container of Comparative Example 1, in which all the reduced pressure absorbing panels had a depth of 3.0 mm to ensure the amount of reduced pressure to be absorbed, the outer circumferential surface of the trunk was scratched during mold opening. Alternatively, the synthetic resin container of Comparative Example 2, in which all the reduced pressure absorbing panels had a depth of 2.0 mm to prevent the outer circumferential surface of the trunk from being scratched during mold opening, failed to ensure the amount of reduced pressure to be absorbed.

In contrast, as can be confirmed from Table 1, the synthetic resin container of Example was capable of preventing the outer circumferential surface from being scratched during mold opening while ensuring the amount of reduced pressure to be absorbed.

Needless to say, the present disclosure is not limited to the aforementioned embodiment, and may be subjected to various alterations without departing from the gist thereof.

For example, the mold for use in blow molding the synthetic resin container 1 is not limited to the right and left split mold which opens right and left, and may employ, for example, a mold to be split into two or more, such as a three-split mold which is split into three in the circumferential direction. In this case, the number of the parting lines PL to be formed on the synthetic resin container 1 will be the same as the number of the splits.

The aforementioned embodiment is configured such that the parting line PL passes through three of the reduced pressure absorbing panels 11. However, without being limited thereto, the number of the reduced pressure absorbing panels 11 to be passed through by the parting line PL may be changed in various ways depending on the length and the inclination angle relative to the central axis S of the reduced pressure absorbing panel 11, as long as the parting line PL is configured to pass through at least two of the reduced pressure absorbing panels 11, by passing through the upper part 11c of one (first reduced pressure absorbing panel 111) of the reduced pressure absorbing panels 11 while passing through the lower part 11d of the other one (second reduced pressure absorbing panel 112) of the reduced pressure absorbing panels 11.

Further, in the aforementioned embodiment, the third reduced pressure absorbing panel 113, in which the parting line PL passes through the central part 11e thereof, has a depth at the central part 11e shallower than the depth at the central part 11e of the first or second reduced pressure absorbing panel. However, without being limited thereto, the depth at the central part 11e of the third reduced pressure absorbing panel 113 may be the same as the depth at the central part 11e of the first reduced pressure absorbing panel 111 or as the depth at the central part 11e of the second reduced pressure absorbing panel 112.

Further, in the aforementioned embodiment, all the reduced pressure absorbing panels 11 had a depth at the upper part 11c and the lower part 11d, which is formed shallower than the depth at the central part 11e of the first reduced pressure absorbing panel 111 or the depth at the central part 11e of the second reduced pressure absorbing panel 112. However, without being limited thereto, only the upper part 11c and the lower part 11d which are passed through by the parting line PL may exclusively be configured to have a depth shallower than the depth at the central part 11e of the first reduced pressure absorbing panel 111 or the depth at the central part 11e of the second reduced pressure absorbing panel, and the rest of the upper part 11c and the lower part 11d other than those mentioned above may be configured to have the same depth as the depth at the central part 11e of the first reduced pressure absorbing panel 111 or the depth at the central part 11e of the second reduced pressure absorbing panel.

Further, in the aforementioned embodiment, the upper part 11c is defined to range from a position 20 mm above the center position in the vertical direction thereof to the upper end, the lower part 11d is defined to range from a position 20 mm below the center position in the vertical direction thereof to the lower end, and the central part 11e is defined to range between 10 mm above and below the center position in the vertical direction. However, these ranges may be changed in various ways depending on the positional relation to the parting line PL.

Further, in the aforementioned embodiment, the plurality of the reduced pressure absorbing panels 11 are each configured to have a uniform circumferential width in the longitudinal direction. However, without being limited thereto, the reduced pressure absorbing panels 11 may be formed, for example, such that the reduced pressure absorbing panels 11 each have a wider circumferential width at the central part 11e than the circumferential width at the upper part 11c and the lower part 11d thereof, or have a narrower circumferential width at the central part 11e than the circumferential widths at the upper part 11c and the lower part 11d thereof.

When the plurality of the reduced pressure absorbing panels 11 are each configured to have a narrower circumferential width at the central part 11e than the circumferential width at the upper part 11c and the lower part 11d thereof, the reduced pressure absorbing panels 11 may be curved at only one of the side surface 11a sides toward the other side surface 11a side or may be curved at both side surface 11a sides toward each other side surface 11a side, to thereby narrow the circumferential width at the central part 11e. When the plurality of the reduced pressure absorbing panels 11 are each formed to have a narrower circumferential width at the central part 11e than the circumferential width at the upper part 11c and the lower part 11d as described above, a shrink label applied to the reduced pressure absorbing portion 10 can be suppressed from generating wrinkles along with the deformation of the reduced pressure absorbing portion 10, and thus, the shrink label can be stably applied in an easy-to-see manner. The aforementioned effect can similarly be obtained when a roll label or a tack label is attached, in place of a shrink label, to the reduced pressure absorbing portion 10. Here, the shrink label refers to a label made of a heat-shrinking film such as polystyrene (PS) and polyethylene terephthalate (PET) and formed in a tubular shape having a diameter larger than that of the trunk 4. When heated by hot air or the like in a state where the shrink label covers the outer side of the trunk 4, the shrink label shrinks and adheres to the outer circumferential surface of the trunk 4. The roll label, which is also called wrap label, is made of a resin film or the like and formed in a band shape. The roll label is wrapped around the outer circumferential surface of the reduced pressure absorbing portion 10 and overlapping parts at both ends thereof are adhered via an adhesive or the like, so as to be applied to the reduced pressure absorbing portion 10 in the state of being wrapped. The tack label, which is made of a laminate paper or synthetic paper, is bonded to the outer circumferential surface of the reduced pressure absorbing portion 10 via a tackifier or the like.

Further, in the aforementioned embodiment, the synthetic resin container 1 is applied for use in containing a beverage, including a juice beverage and tea, or a liquid seasoning, including soy sauce, vinegar, and dressing, as the content medium. However, without being limited thereto, the disclosed synthetic resin container 1 may also be applied for use in containing other content media such as food or cosmetics, which are as long as hot-filled.

REFERENCE SIGNS LIST

1 synthetic resin container
2 mouth
2a male screw
3 shoulder
4 trunk
5 bottom
6 neck ring
7 upper horizontal groove
8 lower horizontal groove
10 reduced pressure absorbing portion
11 reduced pressure absorbing panel
111 first reduced pressure absorbing panel
112 second reduced pressure absorbing panel
113 third reduced pressure absorbing panel
11a side surface
11b bottom surface
11c upper part
11d lower part
11e central part
12 support portion
S center line
PL parting line

The invention claimed is:

1. A synthetic resin container in a bottle shape comprising a mouth as a dispensing spout for a content medium, a trunk extending contiguous to the mouth via a shoulder, and a bottom closing a lower end of the trunk, the container comprising:

a parting line formed on the trunk as extending in the vertical direction; and a plurality of reduced pressure absorbing panels each formed as a groove extending in the vertical direction while twisting in the circumferential direction about the central axis of the trunk, the reduced pressure absorbing panels being disposed in the trunk as being arranged side by side in the circumferential direction, wherein:

the plurality of the reduced pressure absorbing panels includes a first reduced pressure absorbing panel where the parting line passes through an upper part thereof, a second reduced pressure absorbing panel where the parting line passes through a lower part thereof, and a third reduced pressure absorbing panel where the parting line passes through a central part thereof in the vertical direction, the first reduced pressure absorbing panel is shallower in depth at the upper part thereof than at a central part thereof in the vertical direction, the second reduced pressure absorbing panel is shallower in depth at the lower part thereof than at a central part thereof in the vertical direction, and the depth at the central part in the vertical direction of the third reduced pressure absorbing panel is shallower than the depth at the central part in the vertical direction of the first reduced pressure absorbing panel and of the second reduced pressure absorbing panel, and the depth at the upper part of the first reduced pressure absorbing panel, the depth at the lower part of the second reduced pressure absorbing panel and the depth at the central part of the third reduced pressure absorbing panel are the same.

2. The synthetic resin container according to claim 1, wherein all the reduced pressure absorbing panels each have shallower depths at the upper part and the lower part thereof than the depth at the central part in the vertical direction of the first reduced pressure absorbing panel and of the second reduced pressure absorbing panel.

3. The synthetic resin container according to claim 1, wherein the plurality of the reduced pressure absorbing panels are configured to absorb reduced pressure through deformation, the reduced pressure being caused by cooling of the content medium.

4. The synthetic resin container according to claim 3, further comprising a plurality of support portions that separate the plurality of the reduced pressure absorbing panels from each other.

* * * * *